(12) United States Patent
Rumpler et al.

(10) Patent No.: US 6,711,713 B1
(45) Date of Patent: Mar. 23, 2004

(54) METHOD AND APPARATUS FOR DETECTION, TRANSMISSION AND PROCESSING OF SAFETY-RELATED SIGNALS

(75) Inventors: Gerhard Rumpler, Erlangen (DE); Gerhard Kahle-Nobis, Nürnberg (DE); Christof Meier, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/564,596

(22) Filed: May 3, 2000

(30) Foreign Application Priority Data

May 3, 1999 (DE) .......................... 199 20 299

(51) Int. Cl.[7] .............................. G06F 11/16
(52) U.S. Cl. ............................ 714/820; 700/21
(58) Field of Search ................. 714/819, 820, 714/821; 700/21

(56) References Cited

U.S. PATENT DOCUMENTS 5,761,245 A * 6/1998 Haukkavaara et al. ...... 375/267
5,947,423 A * 9/1999 Clifton et al. ................ 246/62
6,009,356 A * 12/1999 Monroe ....................... 701/14
6,236,949 B1 * 5/2001 Hart ............................ 702/64
6,301,514 B1 * 10/2001 Canada et al. ............. 700/108
6,489,884 B1 * 12/2002 Lamberson et al. ......... 340/7.2

* cited by examiner

Primary Examiner—Stephen M. Baker
(74) Attorney, Agent, or Firm—Staas & Halsey LLP

(57) ABSTRACT

The use of radio technology for transmission of EMERGENCY-OFF, START-, STOP- and process and confirmation signals from industrial processing machines, such as numerically controlled machine tools and robots, by radio is described. There is no need for any additional safety measures for the START and process signals by means of a confirmation signal, provided the control functions satisfy appropriate safety requirements. To this end, safety-relevant signals are physically detected on at least two channels at the transmitter end, the detected data are logically transmitted by at least two channels using a safety technique by radio to a receiver end, and the received data are likewise physically processed and monitored on at least two channels at the receiver end. In addition to the safety-related signal data, additional protection data are produced for monitoring purposes and are used at the receiver end for monitoring by checking the plausibility of a redundant value for data protection and by cross-comparison of the evaluation results, etc.

19 Claims, 2 Drawing Sheets

METHOD AND APPARATUS FOR DETECTION, TRANSMISSION AND PROCESSING OF SAFETY-RELATED SIGNALS

FIELD OF THE INVENTION

The present invention relates to a method and an apparatus for detection, transmission and processing of safety-related signals having at least one detector, one transmission path and at least one signal processor.

BACKGROUND INFORMATION

In order to control machines in manufacturing systems in industry, in particular machine tools and robots, signals are transmitted from controllers or peripherals to a control unit. In this case, the controllers and peripherals may be either stationary or mobile units. In particular, safety-relevant signals such as EMERGENCY-OFF, EMERGENCY-STOP, START, STOP, confirmation signals, movement buttons and safety-related input signals regularly have to be reliably detected, transmitted and processed in order to ensure the safety of the operator, of the machines and of the systems. Signals which initiate movements, for example shaft movement, gripper pick-up and the like, are also related to this problem.

Conventionally, safety-related signals are therefore generally transmitted by wire. EMERGENCY-OFF, confirmation and safety-relevant input signals are detected via duplicated electromechanical switching elements. Movement buttons, START and STOP, on the other hand, are detected via simple electromechanical, electrical or electronic switching elements.

For transmission, the signals are conventionally transmitted via a bus system, a serial link or a parallel link, or else directly via wires.

EMERGENCY-OFF signals are passed via two pairs of wires to safety tripping units. On the other hand, depending on the mode, START, STOP and movement buttons are subject to different safety requirements. START, STOP and movement button signals are generally transmitted via the bus system, the serial link or the parallel link. If these signals have an associated safety function, then the signals are effective only in conjunction with confirmation buttons, which are routed to the tripping unit via wires. Such so-called confirmation buttons must in this case be operated at the same time as the movement buttons. Safety-relevant inputs are carried via their own wires.

Conventionally, the transmission itself takes place via a cable which, apart from the necessary signal lines, normally also includes supply lines for current and/or voltage for the control unit. The cable must be suitable for industrial operational conditions, which means that electrical interference, mechanical loads and chemical influences have to be considered.

Signals such as EMERGENCY-OFF and confirmation signals are electrically processed in two channels. On the other hand, START, STOP and movement buttons are processed in one channel, taking account of a confirmation signal.

The wire-based link between the control unit and the controllers or peripherals has the disadvantages, in particular, of the costs of a wire-based link, the installation complexity associated with this, as well as poorer mobility, maintenance effort for the cable, the risk of accidents linked to this, and the necessity for the already described confirmation button.

SUMMARY

An object of the present invention is to provide a method and an apparatus for detection, transmission and processing of safety-related signals, in which the disadvantages mentioned above can be avoided.

The term safety-related signals in this case means signals in which faults or errors in the detection, transmission and evaluation can lead to loss of safety functions in the machine, system or process.

According to the present invention, this object is achieved by a method for detection, transmission and processing of safety-related signals having at least one detection means, one transmission path and at least one signal processing means, in that safety-relevant signals are physically detected on at least two channels at the transmitter end, the detected data are logically transmitted by at least two channels using a safety technique by radio to a receiver end, and the received data are likewise physically processed and monitored on at least two channels at the receiver end.

A corresponding apparatus for achieving the above object according to the present invention is characterized in that the detection means for safety-related signals are designed physically with at least two channels at a transmitter end, a radio path which logically has at least two channels and uses a safe technology is provided with in each case one radio module at the transmitter end and receiver end, and the signal processing means at the receiver end are likewise designed physically with at least two channels.

The present invention thus allows radio transmission of signals for controlling machines, appliances and processes, including safety-relevant signals such as EMERGENCY-OFF, EMERGENCY-STOP, START, STOP, confirmation signals, movement buttons and safety-related input signals as well as signals which initiate movement. Safe evaluation of the signals by software can also be achieved. The present invention furthermore ensures that an individual fault or error in the detection, transmission and evaluation does not lead to any loss of safety functions.

According to a first example refinement, the safety-related signals are detected by redundant signals being produced, for example by means of duplicated electromechanical, electrical or electronic input elements. Various redundant signals are detected in two channels by means of two detection modules, and this can be achieved either by hardware, or by hardware and software. The detected signals provide protection data for signal transmission from each detection module, allowing monitoring for incorrect transmitters or incorrect receivers, adulteration of the data, loss of data and repetition of data.

In this case, each detection means uses the signal data to produce additional protection data for monitoring purposes.

According to a further example refinement of the present invention, the transmission is carried out using a transmission module, in each case one transmission and reception module, and one receiver module. The transmission and reception modules as well as the radio modules are each formed from different components. The radio transmission takes place using digital technology. Major parts of the signal processing for the transmission can be implemented in software. The transmission module receives the signal data, and the associated protection data, from both detection modules, cyclically. The data in both channels are then transmitted jointly, by radio. The received data in the two channels are separated again by the receiver module. In order to process the data and to carry out the monitoring function, the data are then passed on to the respective evaluation and monitoring module for channel 1 and channel 2.

According to a further example refinement of the present invention, the signals are likewise monitored and processed in two channels, in particular on two separate processors, such as signal processors. The data are monitored in each channel on the basis of the following criteria:

incorrect sender or incorrect receiver, adulteration of the data during transmission, loss of data, repetition of data and interruption of the data.

A time criterion is monitored in each channel, as a consequence of which safety-relevant functions are, as a rule, initiated after a predetermined time period after detection of the signals. This is ensured according to the present invention by the signals always being transmitted after a predetermined time period for processing.

The serviceability of an EMERGENCY-OFF and STOP input element as well as the associated operation of the respective detection module are monitored in each channel by positive dynamic activation means.

After evaluation, faults and errors in each channel are detected by comparison of the evaluation results.

The reactions to be initiated after detection of a fault or error depend on various factors, such as the respective application, the respective safety policy, the respective machine, controller or system.

Furthermore, any protection methods can also be carried out, if required, by radio transmission independently of the described monitoring.

The processing leads to the execution of the control function to be initiated by input signals. The execution of the control function may likewise be carried out on two channels, depending on the safety requirement. The two-channel detection, safe transmission and two-channel monitoring and processing make it possible to dispense with an additional confirmation signal—for example a confirmation button provided the downstream control functions are carried out using a safe technique.

According to a further example refinement of the present invention, a redundant value for data protection is also added to and transmitted with the signal data and protection data. In addition to monitoring by cross-comparison of data in the two channels, the safety of the transmission can be further increased by checking the plausibility of this redundant value for data protection.

According to a further example refinement of the method and of the apparatus according to the present invention, a further improvement in safety is achieved by additionally providing each data packet with a counter value, which is produced at the transmitter end, in which case the counter value is incremented or decremented for each data packet to be transmitted, and the redundant value for data protection is formed via signal data, protection data and the counter value.

According to a further example refinement of the method and of the apparatus according to the present invention, the data are transmitted particularly efficiently by radio in that at the transmitter end, each data packet is separated into an implicit and an explicit data element, with the implicit data element comprising those data which are known at the receiver end, and in order to minimize the volume of data to be transmitted, only the explicit element of the data packet is transmitted by radio, and at the receiver end, the data packet is reconstructed from the known information and the received explicit element.

The present invention may be used particularly advantageously in conjunction with industrial processing machines or manufacturing systems, in particular numerically controlled machine tools or robots.

In this case, in addition to a refinement using a two-channel technique, an implementation is, of course, also likewise possible with more than two channels according to the teaching of the present invention.

The formation of a safe radio data link according to the present invention can be achieved particularly advantageously by a method which is distinguished by a receiver registering with the transmitter, in that communication addresses for the transmitter end and receiver end are uniquely defined for each channel, a radio link is produced between the transmitter and the receiver, the communication addresses are transmitted to the receiver in the form of a data packet, with the registration process being terminated, if a predetermined time window is exceeded or any loss or repetition of data occurs, or a cross-comparison leads to detection of a fault or error, or the redundant value for data protection is identified as not being plausible.

The use of the radio system for transmission of safety-related signals for controlling, inter alia, machines according to the present invention thus results in the following advantages:

no costs for wire-based connection, reduced installation complexity for stationary appliances, since no wire-based connection need be installed, for portable appliances, greater mobility, no weight loading from a cable, no risk of accidents from a cable, no maintenance effort for a cable, and no complexity for confirmation buttons.

The present invention thus allows the radio technique to be used for transmission of EMERGENCY-OFF, START, STOP and movement and confirmation signals via radio. There is no need for any additional protection for START and movement signals by means of confirmation signals—in particular confirmation buttons, provided the control functions satisfy appropriate safety requirements.

DETAILED DESCRIPTION

Figure 1:
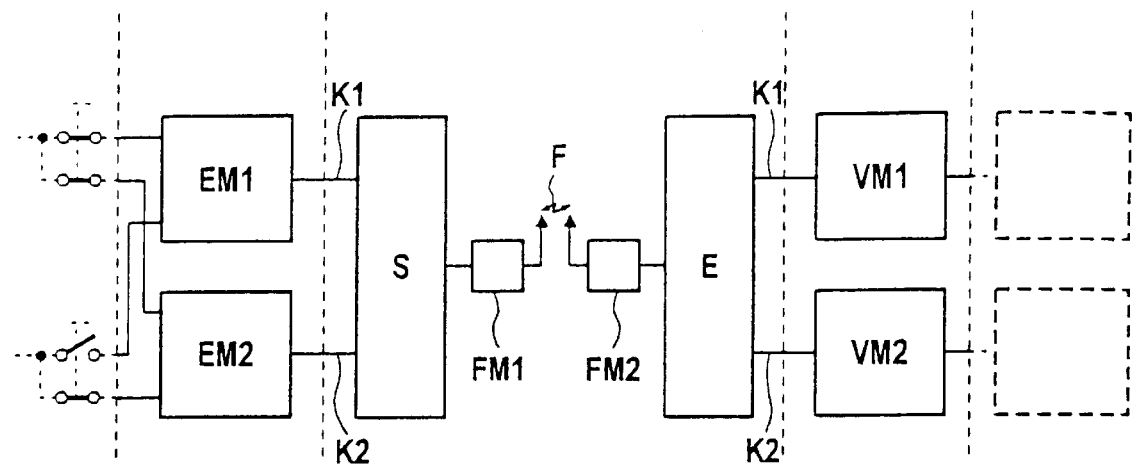
FIG. 1 shows a block diagram of an apparatus according to the present invention.
Figure 4:
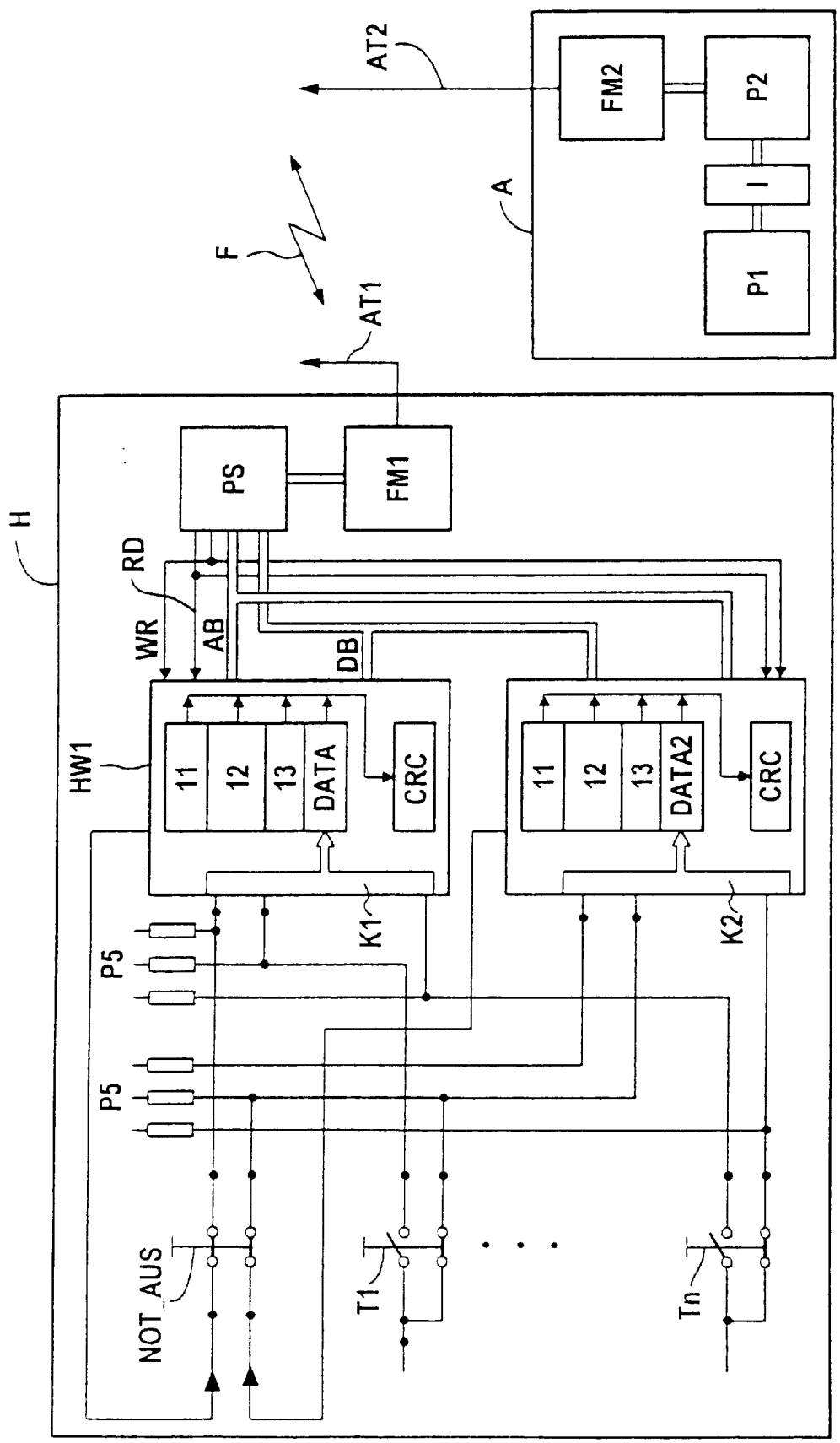
FIG. 4 shows a block diagram of an automation system with a hand-held appliance according to the present invention.

FIG. 1 shows a simplified block diagram of an apparatus, which is described in more detail in the illustration shown in FIG. 4. According to FIG. 1, inputs are sketched schematically on the left-hand side, and are connected to a first and a second detection unit EM1 and EM2. The detection unit EM1 is associated with a first channel K1, via which the output signals are passed to a transmission module S. The same applies to the output signals from the detection unit EM2 via a channel K2. The transmission module S in turn controls a radio module FM1, which transmits data to a second radio module FM2 via a radio link F or, conversely, receives data from it. The data pass via the second radio module FM2 to a receiver module E, in that they are split into the channels K1 and K2, which already exist at the transmitter end, and are supplied by each channel to an associated processing means VM1 and VM2, respectively, via which appropriate control functions are then initiated. Such control functions are indicated schematically on the right-hand side.

The illustration in FIG. 4 shows a block diagram with a hand-held appliance H and an automation system A, which provides two independent reception processors P1 and P2 for data transmission of safety-relevant buttons (EMERGENCY-OFF, START, STOP, movement buttons etc.) by radio. Digital data radio based on the DECT (Digital Enhanced Cordless Telecommunication) radio standard may be used, for example, as the radio technique. In addition to the safety-relevant buttons EMERGENCY_OFF, T1 ... Tn, the hand-held appliance H has an additional safety-relevant button for starting up, and a radio registration button (not shown) for initialization of the radio connection. The controller A is equipped with a radio activation button or switch (likewise not shown), which is designed using a safety technique.

Each safety-relevant button has two switching contacts C, D and C1, D1, respectively. In the case of START or movement keys, the switching contacts provide two inverted signals. If the button is not operated, one contact supplies a high level, and the other a low level. EMERGENCY-OFF and STOP provide two signals in the same sense, in that both contacts are in the form of break contacts. In the embodiment described in the illustration in FIG. 4, the closed switch state is, for example, signaled by a low level. The two switching contacts of each switching element EMERGENCY_OFF, T1 . . . Tn are each passed to a hardware module HW1 and HW2, respectively. Each hardware module converts the signal level into binary data. Low becomes 0 (ZERO) and high becomes 1 (ONE). The data are then provided as button information in a register DATA for transmission. In addition, the following items are provided in the other registers 11 to 23:

transmission address (transmission processor PS) or receiver address (reception processor P1 or reception processor P2, respectively) 12 or 22, respectively, counter value 13 or 23, respectively, redundant value for data protection CRC or CRC2, respectively, and length of such data 11 or 12, respectively.

A counter value is incremented for each read access in the hardware modules HW1 and HW2, respectively, and hardware redundancy check is carried out by CRC formation related to the length, transmission address, receiver address, count value and button information (CRC stands for Cyclic Redundancy Check, a method familiar to persons skilled in the art). The counter is, for example, a hardware counter which is loaded with an initial value when a connection is set up. This value is incremented for each read access to the safety-related button information (continuous decrementation is, of course, also possible), and the value is transmitted via the radio path. The counter value incremented with respect to the latest safety-related information is used to confirm the authenticity of the channel information to the receiver processors P1 and P2, respectively.

The data from both hardware modules HW1 and HW2 are read by the transmission processor PS in a permanently set cycle (for example every 30 ms), and are combined in a data packet. The transmission processor transfers this data packet to the first radio module FM1, for transmission via the radio path F.

At the receiver end, the data are received by the radio module FM2 via the corresponding antenna AT2, and are transmitted to the reception processor P2—by way of example in this case. The reception processor P2 monitors the data for channel K2. The data for channel K1 are transferred to the reception processor P1, and are monitored by it.

Figure 2:
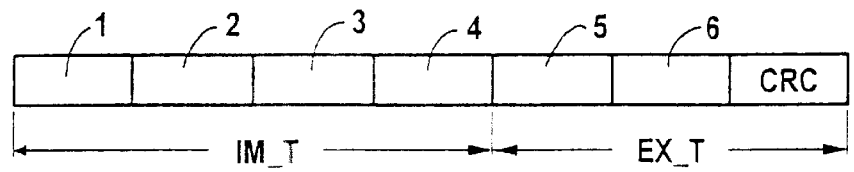
FIG. 2 shows a data structure of a data packet.

The illustration in FIG. 2 shows a sketch of the data structure of such a data packet. The data in the two channels K1 and K2 are combined in a data packet, and this data packet is transmitted via a radio channel, as described above. Data in a transmission channel thus represent a logic link. For this purpose, the data packet is split into an implicit element IM_T and an explicit element EX_T. The implicit element IM_T contains the information relating to the length 1, reception address 2, transmission address 3 and the most significant bit element MSB of the counter 4. The explicit element EX_T contains the least significant bit element LSB of the counter 5, the button information 6 and the redundant value CRC. The illustration in FIG. 2 thus shows the data for a transmission channel K1 or K2, and thus represents the logic link. In order to minimize the amount of data to be transmitted, the data in the implicit element IM_T are not transmitted, since such data are stored, and are thus known, in the receiver processors P1 and P2.

In this case, the receiver address is used for unique receiver identification for evaluation of the transmitted structure in the reception processor P1 or reception processor P2. The transmission address is used for unique transmitter identification during the evaluation of the transmitted structure in the reception processor P1 or P2. The counter has already been explained above. The most significant bit element MSB of the counter is determined by counter overflows at the receiver processors P1 and P2, and the complete counter value is recovered from the most significant bit element MSB and least significant bit element LSB. The button information represents the ON/OFF state of the button switching contacts. The redundant value CRC is formed from the length, receiver address, transmission address, counter value and button information elements. An irreducible, primitive polynomial is used, for example, as the CRC polynomial.

Figure 3:
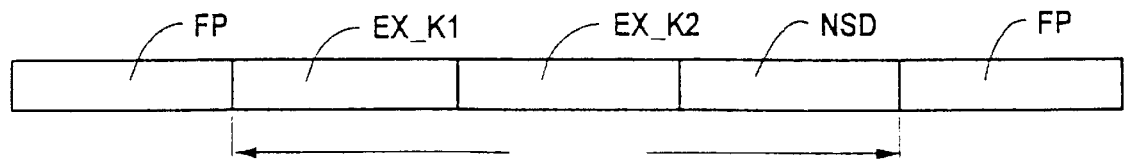
FIG. 3 shows a data structure of a radio message with two logic links.

The explicit element EX_T of the structure described above is transmitted via the radio path. Such data in the two channels K1 and K2 recur in the wanted data of the radio message as two logic links, whose data sequence is shown schematically in the illustration in FIG. 3. Together with the information which is not safety-relevant and is intended to be interchanged between the hand-held appliance H and the automation system A, the construction of a radio message is, for example, as follows:

A radio protocol FP is followed by the explicit element for channel 1 EX_K1, then the explicit element for channel 2 EX_K2, and then the data which are not safety-relevant. These radio data are in turn followed by a radio protocol FP, etc.

Before a safe communication can be set up, the hand-held appliance must be registered with the controller. This registration has to be carried out once for each communication pair (hand-held appliance/controller).

During the registration process, the communication addresses of the hand-held appliance and the automation appliance are defined uniquely: one transmitter address and receiver address is in each case defined per channel for the hand-held appliance and the automation appliance. Thus, four addresses are required for each connection. There is consequently a unique relationship between the hand-held appliance and the controller, which can also be signaled by indication or by a permanently used identification. This address allocation method is described in the following text:

Operator actions are used on the following control elements, for registration:

on the controller:
radio activation switch (for example key-operated switch) with the following positions
0 OFF.
1 Registration
2 Safe radio communication on the hand-held appliance
radio on/off button.

The registration should be carried out within a fixed predetermined time (for example 60 seconds).

1. Move the radio activation switch to the "register" position and switch on the hand-held appliance, thus setting up the radio link. This process may be protected against misuse or being carried out accidentally by entering a password and security code for the machine and hand-held appliance.

2. The addresses of the transmitter and receiver are always the same for the registration procedure (see below). The address values 01h and Feh used are not allowed to run during the subsequent address definition. A fixed predetermined number of registration data blocks (for example 200) are transmitted by the hand-held appliance. The registration data blocks are formed, by way of example, with the following values based on the data structure described above (FIG. 2):

transmitter 1=Feh
transmitter 2=01h
receiver 1=01h
receiver 2=Feh
counter value=F000 0000h Both receiver processors monitor all the criteria described further below. Each fault or error that is found leads to the registration process being terminated.

3. While registration data blocks are being transmitted, the radio on/off button (safety-relevant) should be operated for a limited time (for example one second) on the hand-held appliance. During this time, the radio activation switch on the controller must be moved to position 2.

4. Initiated by the radio activation switch, a reception processor successively generates four random numbers, and transmits them to the hand-held appliance. The numbers are defined by 01H <random number <Feh, that is to say the values 0, 1, 254 and 255 are not allowed.

5. A fixed predetermined number of data blocks (for example two data blocks) are then transmitted by the hand-held appliance, with the first random number being included as the transmitter address 1 in the first data block, and this first random value at the same time being transmitted as the counter value in the explicit element. This counter value is incremented in the other data blocks.

6. A fixed predetermined number of data blocks (for example two data blocks) are then transmitted by the hand-held appliance, with the second random value being included as the transmitter address 2 in the first data block, and this second random value at the same time being transmitted as the counter value in the explicit element. This counter value is incremented in the other data blocks.

7. In the same way, the receiver addresses are transmitted back to the receiver processors in further data blocks.

8. Data blocks formed as follows are then transmitted by the hand-held appliance:

transmitter 1 as defined
transmitter 2 as defined
receiver 1 as defined
receiver 2 as defined The first counter value is defined as follows:

counter value=the continuously incremented most recently entered value.

Both receiver processors monitor all the criteria described further below. Each fault or error found leads to termination of the initialization process.

9. The registration process is now be ended by the following operator action: on the hand-held appliance, the radio on/off button (safety-relevant) must be operated for a limited time (for example one second). During this time, the radio activation switch on the controller must be moved to the position 0.

Both receiver processors monitor all the data blocks for all the criteria described further below. Each fault or error found leads to termination of the registration process. Steps 5 to 7 are exceptions. The receiver processors identify a change in the implicit addresses on the basis of a fault or error in the CRC check. There is then a wait until the respective following data block once again satisfies all the monitoring criteria.

In addition, the receiver processors monitor that the entire registration procedure is completed within the fixed predetermined time mentioned above. Otherwise, termination likewise takes place.

The addresses required to set up a safe link are therefore uniquely defined between the transmitter and receiver.

For initialization of the communication:

The following initialization should be carried out to set up a safe link.

1. The radio link is set up by an operator action on the hand-held appliance (selection of the machine). Data blocks are transmitted by the hand-held appliance, using the data structure described above, and with the following data:

transmitter 1 as defined during registration
transmitter 2 as defined during registration
receiver 1 as defined during registration
receiver 2 as defined during registration
counter value =0000 0000h Both receiver processors monitor all the criteria described further below. Each fault or error found leads to termination of the initialization process.

2. The radio on/off button (safety-relevant) on the hand-held appliance should be operated for a limited time (for example one second) within a fixed predetermined time (for example 60 seconds). During this time, the radio activation switch on the controller should be moved to position 2. The safe link is thus set up.

Both receiver processors monitor all the criteria described further below. Each fault or error found leads to a termination of the initialization process.

In order to clear the communication:

Deliberate clearing of the connection takes place by once again operating the radio on/off button on the hand-held appliance and by switching off the radio activation switch (position 0).

Monitoring and evaluation of the data at the receiver end:

The data are monitored and processed at the receiver end in the same way on two independent processors (reception processor 1 and reception processor 2).

Plausibility check of the length statement:

The length statement is not transmitted, but is part of the implicit element of the data. As described above, the value is predetermined and is fixed. The position of the data, of the counter value and of the CRC value in the explicit element of the data and determined using the predetermined length value. The correctness of the values read thus depends on the correctness of the length value. The length value is thus checked at the same time as the check, described in the following text, of the transmitted values.

Check for adulteration of the data:

The check for adulteration of the data is carried out by means of the transmitted CRC attachment. At the receiver end, the implicit data length receiver address transmitter address counter value (3 MSB)

and the transmitted explicit data counter value (1 LSB)

safe button signals are used to determine a CRC comparison value (as described above). This is compared with the transmitted CRC value.

Check of the transmitter and receiver address:

Receiver and sender addresses are not transmitted, but are included in the CRC determination. The check described above for adulteration of the data is thus at the same time a check that the transmitter and receiver addresses are correct.

Check for loss and repetition of data:

The succession of data packets is determined by comparing the counter value of the present data packet with the counter value of the previous data packet, thus identifying any loss or repetition of data packets.

Check for transmission interference:

An interruption of the radio link or of the entire communication path is implemented by monitoring for signs of life. There is a wait until data packets are received regularly. A time period is defined for the maximum time interval between two successive packets. If this time is exceeded, then the transmission is subject to interference.

Cross-comparison:

Cross-comparison of data is carried out between the two channels in order to provide further fault or error detection.

If a fault or error is found on the basis of the criteria mentioned above, then no link is set up. If no fault or error is found, then the link is regarded as being safe, and a first evaluation of the signal or button data is carried out.

What is claimed is:

1. A method for detection, transmission and processing of safety-related signals using at least one detection unit, a transmission path and a signal processor, comprising:

detecting safety-relevant signals on at least two physical channels at a transmitter end, the safety-relevant signals including signal data, the safety-relevant signal including redundant signals;

transmitting the detected signal data by radio on at least two logical channels to a receiver end using a safety technique;

processing and monitoring the received signal data on at least two physical channels at the receiver end;

producing the redundant signals using at least duplicated electromechanical or electronic input elements; and producing additional protection data by each detection unit from the signal data for monitoring purposes, the protection data allowing monitoring for at least one of: i) incorrect transmitters or incorrect receivers, ii) adulteration of the safety-relevant data, iii) loss of data, and iv) repetition of data.

2. The method according to claim 1, wherein the transmitting step includes transmitting the signal data using a digital technique, the digital technique including cyclically detecting the signal data and the protection data, forming a data packet from the signal data and the protection data of the at least two physical channels at the transmitter end, the data packet including an added redundant value for data protection, and transmitting the data packet by radio to the receiver end.

3. The method according to claim 2, further comprising:

providing at the transmitter a counter value;

incrementing or decrementing the counter value for each data packet to be transmitted;

for each data packet, forming the data protection using the signal data, the protection data and the counter value.

4. The method according to claim 2, further comprising:

at the transmitter, separating each data packet into an implicit data element and an explicit data element, the implicit data element including data known at the receiver end; and transmitting only the explicit data element of each data packet by radio in order to minimize a volume of data to be transmitted; and at the receiver end, reconstructing the data packet from the known data and the received explicit element.

5. The method according to claim 2, further comprising:

setting up a safe radio data link with the receiver registering with the transmitter, including uniquely defining communication addresses for the transmitter and the receiver end for each of the at least two channels, providing a radio link between the transmitter and the receiver end, transmitting the communication address to the receiver in the form of a data packet, and terminating the registration process if one of: i) a predetermined time window is exceeded, ii) any loss or repetition of data occurs, iii) a cross-comparison leads to detection of a fault or error, and iv) the redundant value for data protection (CRC) is identified as not being plausible.

6. The method according to claim 2, for each received data packet, the receiver end performs the steps of:

separating the signal data and protection data from each of the at least two channels at the transmitter end for each of the at least two channels at the receiver end;

performing a plausibility check of the redundant value for data protection for form evaluation results; comparing the evaluation results in each respective one of the at least two channels at the receiver end; and if the evaluation is correct, passing the signal data and protection data for the respective channel to an associated signal processor for processing of the safety-relevant data and for monitoring purposes.

7. The method according to claim 6, further comprising:
at the receiver end and in each of the at least two channels at the receiver end, monitoring the received signal data and protection data for at least one of: i) incorrect transmitters or incorrect receivers, ii) adulteration of the safety-relevant data, iii) loss of data, iv) repetition of data, v) interruption of transmission.

8. A method for detection, transmission and processing of safety-related signals using at least one detection unit, a transmission path and a signal processor, comprising:
detecting safety-relevant signals on at least two physical channels at a transmitter end, the safety-relevant signals including signal data;
transmitting the detected signal data by radio on at least two logical channels to a receiver end using a safety technique;
processing and monitoring the received signal data on at least two physical channels at the receiver end; and
in each of the at least two physical channels at the transmitter, monitoring serviceability of emergency-off or stop-input units and associated operation of the detection units by a positive dynamic activation arrangement.

9. A method for detection, transmission and processing of safety-related signals using at least one detection unit, a transmission path and a signal processor, comprising:
detecting safety-relevant signals on at least two physical channels at a transmitter end, the safety-relevant signals including signal data;
transmitting the detected signal data by radio on at least two logical channels to a receiver end using a safety technique; and
processing and monitoring the received signal data on at least two physical channels at the receiver end
wherein the safety-relevant signals include at least one of: i) emergency-off signals, ii) emergency-stop signals, iii) signals which initiate movement, and iv) confirmation signals, the safety relevant signals being provided for control purposes in industrial automation.

10. An apparatus for detection, transmission and processing of safety-related signals, comprising:
at least one detection arrangement with at least two physical channels, the at least one detection arrangement being disposed at a transmitter end;
a radio transmission path having at least two logical channels, the radio path using a safe technology, the radio transmission path including a radio module at the transmitter end and a radio module at a receiver end;
a signal processor arrangement disposed at the receiver end, the signal processor arrangement having at least two physical channels; and
duplicated electromechanical, electrical or electronic input element for producing redundant signals;
wherein the detection arrangement produces additional protection data from the redundant signals for monitoring purposes, the additional protection data allowing monitoring for at least one of: i) incorrect transmitters or incorrect receivers, ii) adulteration of the safety-relevant data in the safety-related signals, iii) loss of data, and iv) repetition of data.

11. The apparatus according to claim 10, wherein the radio transmission is carried out using a digital technique, and wherein the detection arrangement cyclically detects the safety-relevant data and the protection data, and wherein the apparatus further comprises:
a transmission module forming a data packet from the safety-relevant data and the protection data of the at least two physical channels at the transmitter end, a redundant value being added to the data packet for data protection (CRC), the data packet being transmitted to the receiver end via the radio transmission path.

12. The apparatus according to claim 11, wherein the transmitter end provides a counter value which is incremented or decremented for each data packet to be transmitted, the redundant value for data protection being formed from the safety-relevant data, the protection data and the counter value.

13. The apparatus according to claim 11, the receiver end includes at least two receiver modules, the at least two receiver modules separating the safety-relevant data and the protection data, checking the plausibility of the redundant value for data protection to form evaluation results, comparing the evaluation results in each of the at least two physical channels at the receiver end, and, if the evaluation results are correct, passing the received signal data and the protection data for each of the at least two physical channels at the receiver end to an associated signal processor of the associated signal processor arrangement for processing of the safety-relevant data and for monitoring purposes.

14. The apparatus according to claim 13, wherein
the transmission module is configured to separate each data packet into an implicit data element and an explicit data element, the implicit data element including data known at the receiver end, only the explicit element of the data packet being transmitted by radio to minimize a volume of data to be transmitted, at least one of the receiver modules reconstructing the data packet from the known data and the received explicit element.

15. The apparatus according to claim 13, further comprising: a monitor arrangement provided at the receiver end, the monitor arrangement monitoring the received safety-relevant data and the protection data in each of the at least two physical channels for at least one of: i) incorrect transmitters or incorrect receivers, ii) adulteration of the safety-relevant data, iii) loss of data, iv) repetition of data, and v) interruption of transmission.

16. The apparatus according to claim 15, wherein the at least two receiver modules include the monitor arrangement.

17. An apparatus for detection, transmission and processing of safety-related signals, comprising:
at least one detection arrangement with at least two physical channels, the at least one detection arrangement being disposed at a transmitter end;
a radio transmission path having at least two logical channels, the radio path using a safe technology, the radio transmission path including a radio module at the transmitter end and a radio module at a receiver end;
a signal processor arrangement disposed at the receiver end, the signal processor arrangement having at least two physical channels; and
a positive dynamic activation arrangement monitoring, in each of the at least two channels in the transmitter end, a serviceability of emergency-off or stop-input units and an associated operation of the detection units.

18. An industrial processing system, comprising:
an arrangement for detection, transmission and Processing of safety-related signals, the arrangement comprising:

at least one detection arrangement with at least two physical channels, the at least one detection, arrangement being disposed at a transmitter end, a radio transmission path having at least two logical channels, the radio path using a safe technology, the radio transmission path including a radio module at the transmitter end and a radio module at a receiver end, and a signal processor arrangement disposed at the receiver end, the signal processor arrangement having at least two physical channels; and a numerically controlled machine tool controlled as a function of the safety-related signals.

19. An industrial processing system, comprising:

an arrangement for detection, transmission and processing of safety-related signals, the arrangement comprising:

at least one detection arrangement with at least two physical channels, the at least one detection, arrangement being disposed at a transmitter end, a radio transmission path having at least two logical channels, the radio path using a safe technology, the radio transmission path including a radio module at the transmitter end and a radio module at a receiver end, and a signal processor arrangement disposed at the receiver end, the signal processor arrangement having at least two physical channels; and a robot controlled as a function of the safety-related signals.

* * * * *